F. A. FOX.
ATTACHMENT FOR TIRE TREADS.
APPLICATION FILED OCT. 10, 1908.
915,842.
Patented Mar. 23, 1909.
2 SHEETS—SHEET 2.
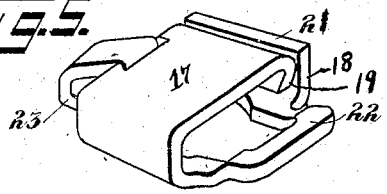
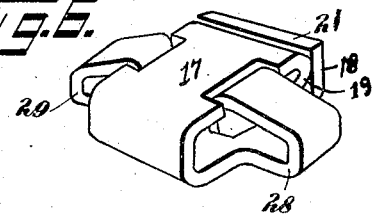
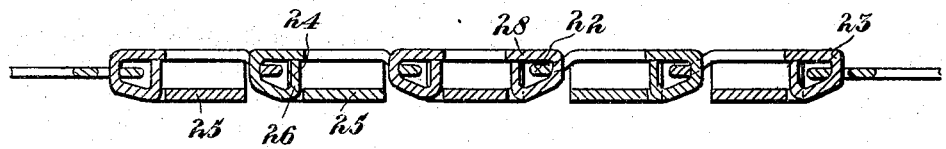
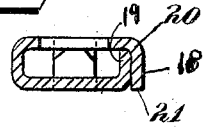
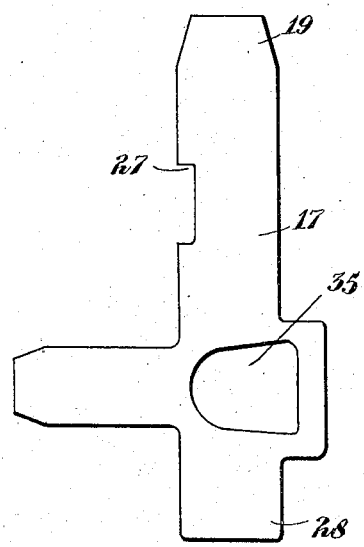
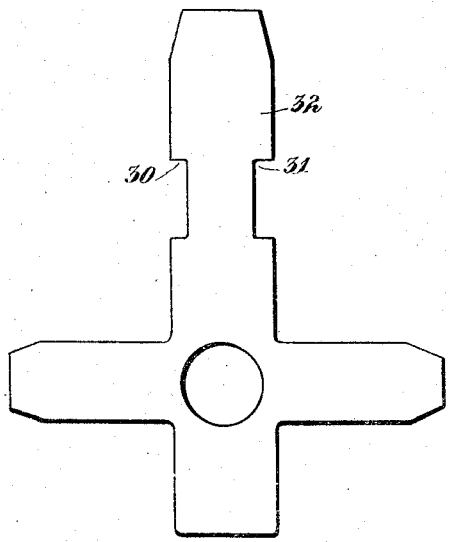
Witnesses:
Inventor:
Frank A. Fox,
By his Attorney,

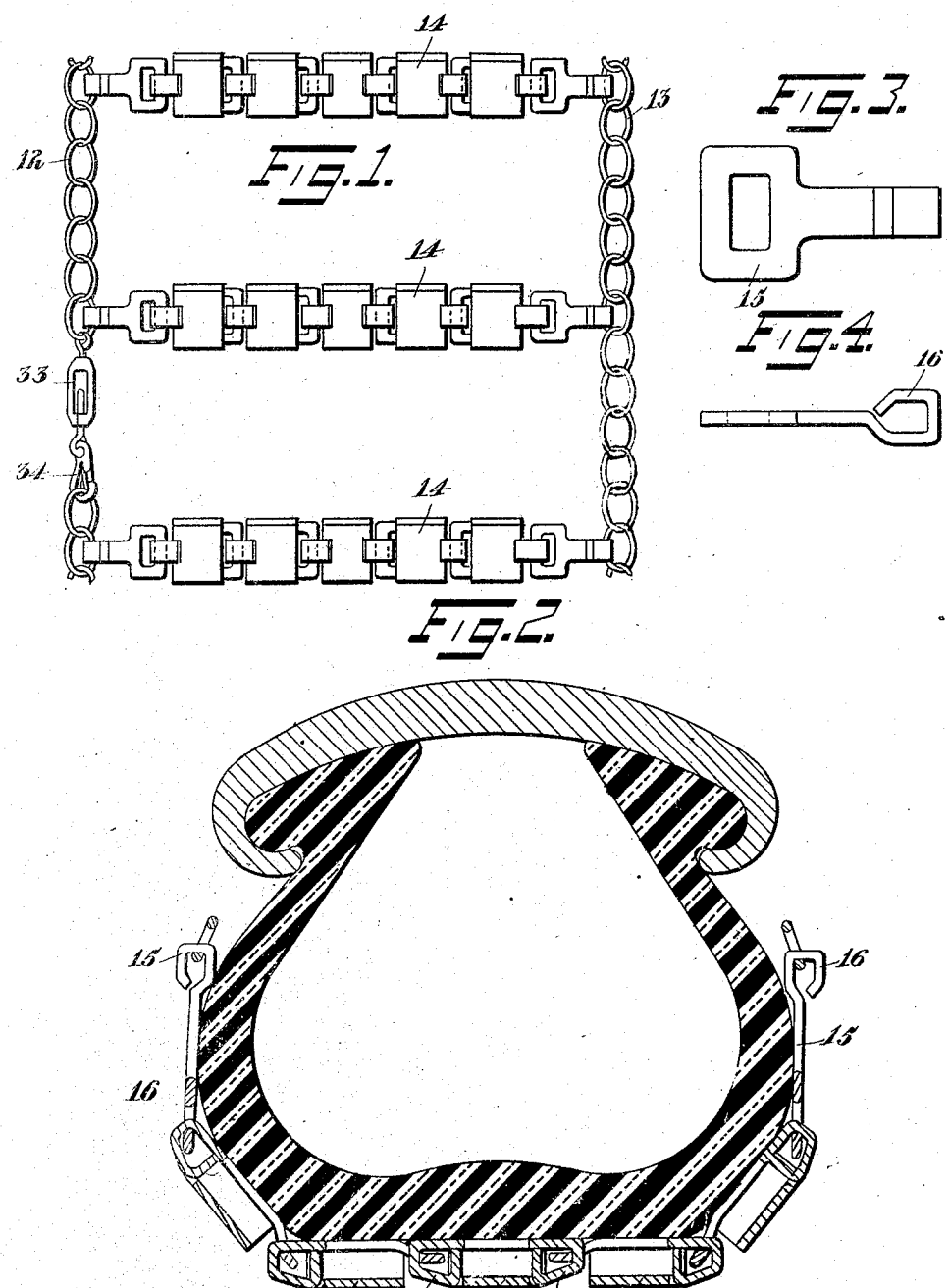

UNITED STATES PATENT OFFICE.

FRANK A. FOX, OF NEW YORK, N. Y., ASSIGNOR TO FOX METALLIC TIRE BELT COMPANY, OF NEW YORK, N. Y., A CORPORATION OF NEW YORK.

ATTACHMENT FOR TIRE-TREADS.

No. 915,842.  Specification of Letters Patent.  Patented March 23, 1909.

Application filed October 10, 1908. Serial No. 457,100.

*To all whom it may concern:*

Be it known that I, FRANK A. FOX, a citizen of the United States, residing in New York city, in the county of New York and State of New York, have invented certain new and useful Improvements in Attachments for Tire-Treads, of which the following is a specification.

This invention has for its object to provide an improved form of anti-skid attachment for tires that will be of simple construction and light weight, at the same time will have a comparatively large gripping surface; and which will have rounded bent portions at the inner tire engaging face.

A further object is to provide a construction in which the wearing portions of the device will be suitably reinforced and in which the hinge portions of the links will be protected against wear.

In the accompanying drawings illustrating embodiments of my invention, Figure 1 shows a portion of the device stretched out in a plane. Fig. 2 is a transverse section through a wheel tire with the chain attached and under tension. Fig. 3 is a plan view and Fig. 4 a side elevation of one of the attaching links. Fig. 5 is a perspective view of one of the cross links. Fig. 6 is a similar view of another cross link. Fig. 7 is a section through one of the cross chains. Fig. 8 is a section of one of the links indicated in Fig. 1. Fig. 9 shows the blank for the link shown in Fig. 5. And Fig. 10 is the blank for the link shown in Fig. 6.

The device is shown as having two flexible side members preferably of chains 12 and 13 between which are connected the independent cross members 14 preferably an equal distance apart and at right angles to the side members.

The cross member is shown in Fig. 7 as formed of a number of links such as shown in Fig. 5, with an intermediate link as shown in Fig. 6. Suitable connecting means are provided between the ends of this cross member and the side members such as the links shown in Figs. 3 and 4. The latter comprises an eye portion 15 and a hook portion 16, the latter engaging a link of the side chain; while the eye portion is engaged by a suitable hook of the end link of the cross member. The links of the cross chain are suitably articulated or hinged together at their adjacent portions. At the intermediate portion is a transverse member that extends across the center of the link on the tread side and is suitably supported at both ends. This transverse member is also preferably raised higher than the articulated portions that have the strain of the chain thereon, so that the wear will be first upon this transverse member.

In the form shown in Fig. 5 the transverse member comprises a tongue 17 that is bent upward from the base, then across the center of the link, with the extremity bent downward to engage the base of the link and support the intermediate tread portion. A structure similar to this is shown and claimed in my application Serial No. 452,770 filed September 12th, 1908. But in the present construction the turned down supporting end of the transverse loop is protected by having a lug portion 18 bent upward outside of and against the end portion 19 of the transverse member, as best shown in Figs. 5 and 8. This not only serves to protect the end supporting portion of the loop member but provides a rounded edge at 20 for engagement with the tire instead of a flat edge as in the said application. This will further provide an end portion 21 of the upturned lug for engagement with the ground thereby insuring greater friction. The links of this construction are suitably articulated or joined to each other. They are shown as provided with an upturned loop or eye portion 22 on one side, while on the other side is a hook portion 23 of a size and shape to engage with a similar eye portion 22 in the adjacent link. The hook portion 23 is bent upward from the base and after passing through the eye is bent diagonally upward with the end portion 24 bent downward to engage the base of the link. By this arrangement it will be observed that the eye portion 22 and the engaged part of the hook 23, lie below the tread face 25 of the links. Therefore the transverse member will receive the strain, together with the uppermost portion 26 of the hook 23. Hence this portion 23 can wear almost through with the corresponding wear of the tread portion 25, yet sufficient of the hook 23 will remain to engage the eye, and the link will not be weakened at the joint. If desired the tongue 17 may have a recess at 27 into which the hook 23 extends and is thereby protected from lateral bending. At one end of the chain the hook 25 engages the eye 15 of the connecting link. This would bring an eye portion at the other end of the series of links. But to engage the connecting link at the other end a hook must be provided at the opposite side of one of the links. Such a construction is shown in the said application. But in the present construction the double hook member is placed in the middle of the cross member. Such a link is shown in Fig. 6, in which the eye 22 is substituted by a hook 28, while the opposite side has a hook 29 both hooks being similar to the hook 23. These two hook members preferably extend into recesses 30 and 31 in the tongue 32. This link with the double hook is placed in the center of the chain and therefore the two other links on the other side will be reversed in position, the hook 28 engaging an eye 22 in the adjacent link, and this will bring a hook portion 23 at this end of the cross member as well as at the other end. The side members 12 and 13 are preferably detachably connected at either ends such as by hooks 33, and may be provided with turn-buckles 34 for proper adjustment. It will be observed that the base of the link is practically flat, and may be provided with a central opening 35 to reduce the weight of the link. When the tire engages the ground with the weight of the car thereon it will flatten out as indicated in Fig. 2 from which it will be seen that three members are practically in a plane.

Having thus described my invention, I claim:

1. A tread attachment for tires comprising side members, cross members secured at their respective ends to the side members, each cross member consisting of a series of links articulated at their opposite ends, the links having an integral tread strip bent upward at one lateral side and extending transversely across the center between said ends and then bent down to engage the base, the links having also an integral lug bent upward from the base engaging the bent end portion of the tread strip.

2. A tread attachment for tires comprising side members, cross members secured at their respective ends to the side members, each cross member consisting of a series of links articulated at their opposite ends, the links having an integral tread strip bent upward at one side and extending transversely across the center between said ends and then bent down to engage the base, the links having also an integral lug bent upward from the base adjacent the bent end portion of the tread strip, and located outside of the said end portion of the strip.

3. A tread attachment for tires comprising side members, independent cross members secured at their respective ends to the side members, each cross member consisting of a series of articulated links, the links having an integral tread strip bent upward at one side and extending transversely across the center and then bent down to the base, the links having also an integral lug bent upward from the base adjacent the bent end portion of the tread strip, and located outside of the said end portion of the strip, the hook portion being inclined downward from the said loop portion.

4. A tread attachment for tires, comprising side members, independent cross members secured at their respective ends to the side members, each cross member comprising a series of links one of the links having hook portions on two opposite sides, a strip bent upward and then extending transversely across the center intermediate of the opposite attaching portions and then bent down onto the base, the hook portions being inclined downward from the said loop portion.

5. A tread attachment for tires, comprising side members, independent cross members secured at their respective ends to the side members, each cross member comprising a series of links one of the links having hook portions on two opposite sides, a strip bent upward and then extending transversely across the center intermediate of the opposite attaching portions and then bent down onto the base, the hook portions being inclined downward from the said loop portion, a lug projecting upward from the base adjacent the downward bent end of the loop.

6. A tread attachment for tires, comprising side members, independent cross members secured at their respective ends to the side members, each cross member comprising a series of links having interlocking hook and eye portions in adjacent links, an integral tread strip bent upward at one side and extending transversely across intermediate of the opposite attaching portions and then bent down to the base of the link, the transverse strip portion having a recess into which extends the said hook.

7. A tread attachment for tires, comprising side members, independent cross members secured at their respective ends to the side members, each cross member comprising a series of links having interlocking hook and eye portions in adjacent links, an integral tread strip bent upward at one side and extending transversely across intermediate of the opposite attaching portions and then bent down to the base of the link, the transverse strip portion having a recess into which extends the said hook, and a lug bent upward from the base adjacent the latter bent part of the strip.

FRANK A. FOX.

Witnesses:
FRED. J. DOLE,
WILLIAM H. REID.